United States Patent [19]

Sasamori et al.

[11] Patent Number: 5,006,958
[45] Date of Patent: Apr. 9, 1991

[54] GAS INSULATION SWITCHGEAR

[75] Inventors: Kenzi Sasamori; Hiroshi Yamamoto; Hiroshi Aoki, all of Amagasaki, Japan

[73] Assignee: Mitsubishi Denki Kabushiki Kaisha, Tokyo, Japan

[21] Appl. No.: 467,201

[22] Filed: Jan. 19, 1990

[30] Foreign Application Priority Data

Jan. 31, 1989 [JP] Japan .................. 1-10538[U]

[51] Int. Cl.$^5$ .............................. H02B 7/01
[52] U.S. Cl. .................. 361/335; 361/341; 361/355; 361/361
[58] Field of Search ........... 200/144 R, 148 R, 148 G, 200/145; 361/335, 341, 355, 361

[56] References Cited

U.S. PATENT DOCUMENTS

| 4,032,820 | 6/1977 | Oishi et al. | 361/341 |
| 4,468,716 | 8/1984 | Kamata et al. | 361/335 |
| 4,479,165 | 10/1984 | Kamata et al. | 361/335 |
| 4,745,522 | 5/1988 | Mitomo et al. | 361/335 |

FOREIGN PATENT DOCUMENTS

| 59-37818 | 3/1984 | Japan . |
| 59-153409 | 9/1984 | Japan . |
| 59-164415 | 11/1984 | Japan . |
| 61-72009 | 5/1986 | Japan . |

Primary Examiner—Gregory D. Thompson
Attorney, Agent, or Firm—Oblon, Spivak, McClelland, Maier & Neustadt

[57] ABSTRACT

In a gas insulation switchgear, an earthed tank 40 contains only a circuit breaker 1; and current transformers 3, 3 to be disposed adjacent to the circuit breaker 1 for detecting over current, are provided in expansion joints 80, 80 to make a length $L_5$ of the earthed tank 40 short.

2 Claims, 3 Drawing Sheets

GAS INSULATION SWITCHGEAR

BACKGROUND OF THE INVENTION

1. Field of the Invention

The present invention relates to a gas insulation switchgear wherein a circuit breaker is provided in an earthed tank filled with insulation gas.

2. Description of Related Art

A gas insulation switchgear which was previously proposed by the inventors of this application and not published prior to Japanese Utility Model Application Hei 1-10538 which is the base of priority claiming, is shown in FIGS. 2 and 3, respectively. FIG. 2 is a connection diagram of a typical gas insulation switchgear and FIG. 3 is a cross-sectional side view of the gas insulation switchgear of related art.

In the figures, the gas insulation switchgear comprises at least one circuit breaker 1, disconnectors 2, 2, current transformers 3, 3, which are provided in an earthed tank 4 containing the circuit breaker 1, shield members 5, 5 for holding the current transformers 3, 3, at least a cable head 6, at least one set of buses 7 and expansion joints 8, 8.

The current transformers 3, 3 are generally disposed adjacent to the circuit breaker 1 for detecting an accidental over current which flows on a bus line of load side or bus side. And the circuit breaker 1 is operated for breaking the current when the current transformer 3 detects the fact that the value of the current becomes larger than a predetermined level. Recently, the current transformers 3, 3 are provided in the earthed tank 4, for miniaturizing the size of the gas insulation switchgear. In such case, the current transformers 3, 3 are fixed to the shield members 5, 5, in order to be contained in the earthed tank 4. Other apparatuses such as the disconnectors 2, 2, the buses 7, the cable head 6 and so on are contained in pressure vessels 9, 10 and 11. As the circuit breaker 1 is especially larger than the other apparatuses, expansion joints 8, 8 are generally provided between the earthed tank 4 and the pressure vessels 9 and 10, to make assembly and disassembly of the gas insulation switch gear easy.

In the circuit breaker 1 of the above-mentioned conventional type, the current transformers 3 and the expansion joints 8, 8 are lined up in a straight line, and the total length $L_2$ of the earthed tank 4 and the expansion joints is relatively long, so that a great space in necessary to install the gas insulation switchgear of the related art.

SUMMARY OF THE INVENTION

The purpose of the present invention is to provide an improved gas insulation switchgear which can be installed in a narrow space.

The gas insulation switchgear includes:
a first earthed tank containing a circuit breaker, therein
a pair of second earthed tanks containing a disconnector therein,
a pair of expansion joints provided between said first earthed tank and said respective second earthed tanks;
said first earthed tank, said second earthed tank and said expansion joins together defining a continuous gastight space containing an insulation gas,
a pair of conductors respectively penetrating through said expansion joints and connecting said circuit breaker and said two disconnectors; and
a pair of current transformers provided in respective hollow inside space of said expansion joints and in a manner such that respective conductors pass through holes of said current transformer.

In the gas insulation switchgear in accordance with the present invention, the current transformers are contained in the inside hollow space of the expansion joints, so that the length of the earthed tank containing the circuit breaker in the lengthwise direction of the conductors is reduced. As a result, the insulation switchgear can be installed in a narrow space.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
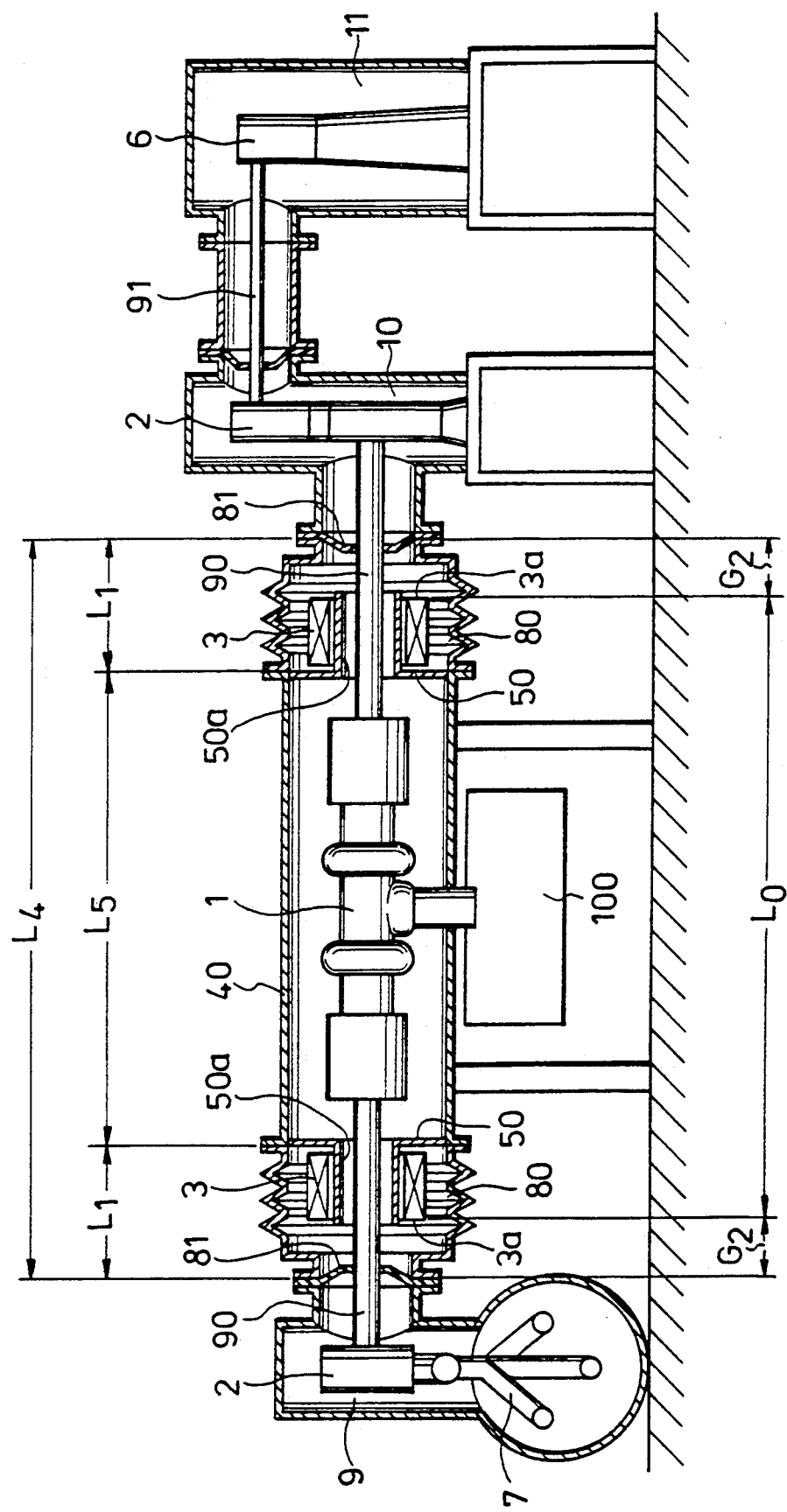
FIG. 1 is a cross-sectional side view showing the construction of a gas insulation switchgear in accordance with the present invention.
Figure 2:
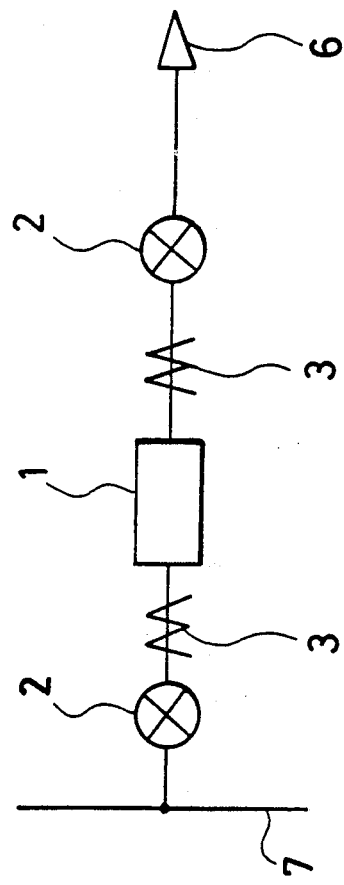
FIG. 2 is a connection diagram of a typical gas insulation switchgear.

A preferred embodiment of a gas insulation switchgear in accordance with the present invention is described referring to FIG. 1.

In FIG. 1, the gas insulation switchgear in accordance with the present invention comprises at least one circuit breaker 1, plural disconnectors 2, 2 connected to the circuit breaker 1 by conductors 90, 90, respectively; plural current transformers 3, 3 disposed between the circuit breaker 1 and respective disconnectors 2, 2; an earthed tank 40 containing the circuit breaker 1; electric shield members 50, 50 provided at both end of the earthed tank 40; at least one cable head 6 connected to one of the disconnector 2; at least one set of buses 7 and plural expansion joints 80, 80 provided at both ends of the earthed tank 40.

The earthed tank 40 has, for example, a tube shape. The shield members 50, 50 are for shielding the current transformer 3, 3 from the current high tension voltage on the conductors 90, 90. The circuit breaker 1 is disposed substantially at the center of the earthed tank 40. A driving mechanism 100 for driving the circuit breaker 1 is provided below the circuit breaker 1, hence below the earthed tank 40. The disconnectors 2, 2 are contained in other earthed tanks or pressure vessels 9 and 10, respectively. Respective disconnectors 2, 2 and the circuit breaker 1 are electrically connected by the conductors 90, 90. The conductors 90, 90 penetrate tube parts 50a, 50a of the shield members 50, 50. The current transformers 3, 3 are respectively disposed on the outer periphery of the tube parts 50a, 50a of the shield members 50, 50. The expansion joints 80, 80 which are bellows, for example, are provided between the pressure vessel 9 and the earthed tank 40 and between the earthed tank 40 and the pressure vessel 10, respectively. Namely, the expansion joints 80, 80 enclose one of the current transformers 3, 3 and one of the conductors 90, 90, respectively. The cable head 6 is contained in still another pressure vessel 11, and a respective disconnector 2 and the cable head 6 are electrically connected by a conductor 91. The buses 7 have, for example, three phases and are contained in the pressure vessel 9. The earthed tank 40, pressure vessels 9, 10, 11 and the expansion joints 80, 80 contain the insulation gas such as $SF_6$.

The total length of the earthed tube 40 and the two expansion joints 80, 80 are given by $$L_4 = L_5 + 2L_1. \tag{1}$$

where: $L_4$ is the total length of the earthed tank 40 and the expansion joints 80, 80; $L_5$ is a length of the earthed tank 40; and $L_1$ is a length of respective expansion joints 80, 80.

Furthermore, the total length $L_4$ is designated by $$L_4 = L_0 + 2G_2. \tag{2}$$

where: $L_0$ is a length between the far-side ends 3a, 3a of respective current transformers 3, 3 which face insulation bushes 81, 81; and $G_2$ is a distance between the far-side ends 3a, 3a of the current transformers 3, 3 and the insulation bushes 81, 81, respectively.

Figure 3:
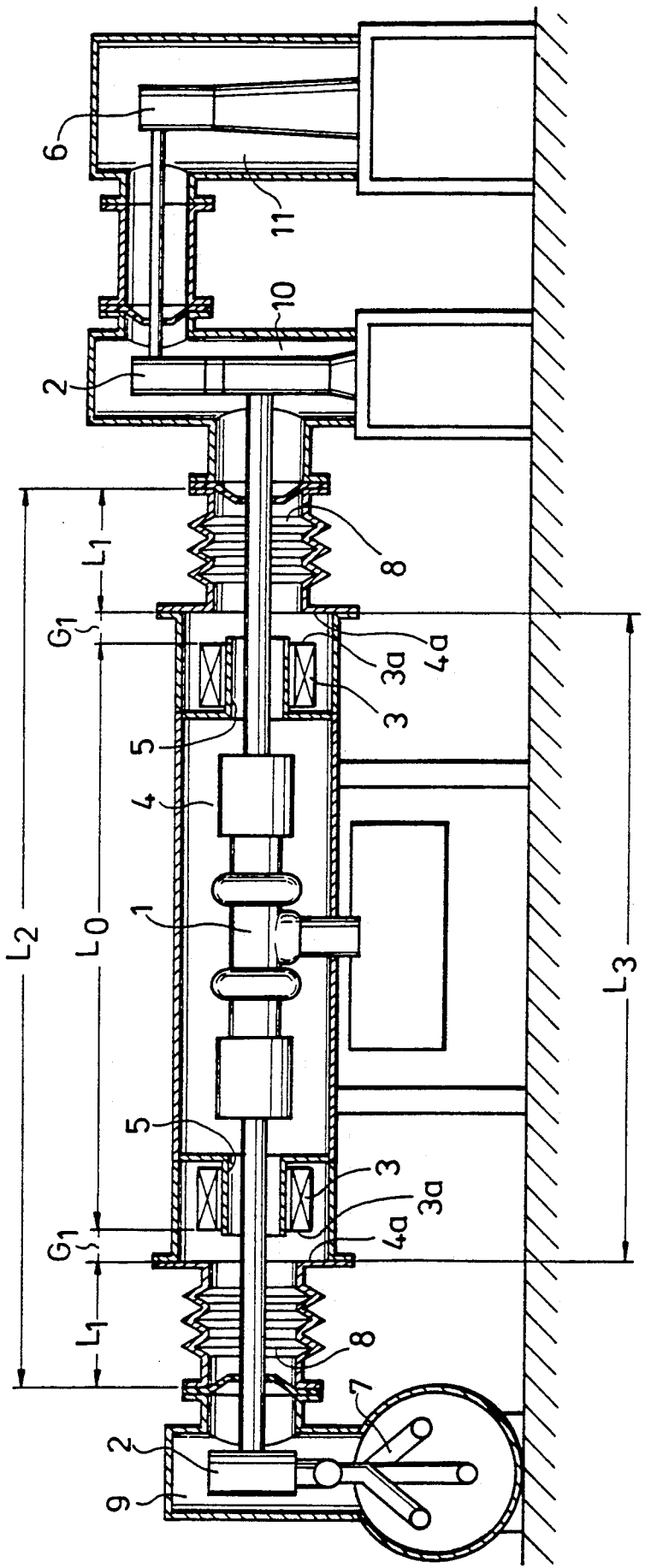
FIG. 3 is the cross-sectional side view showing the gas insulation switchgear of the related art.

Now, the difference between the gas insulation switchgear in accordance with the present invention and the gas insulation switchgear shown in FIG. 3 is as follows.

In FIG. 3, the total length $L_2$ of the earthed tank 4 and two expansion joints 8, 8 are given by $$L_2 = L_3 + 2L_1 \text{ or} \tag{3}$$
$$L_2 = L_0 + 2G_1 + 2L_1. \tag{4}$$

Hereupon, $L_3$ is the length of the earthed tank 4; $L_0$ is the length between the ends 3a, 3a of respective current transformers 3, 3; and $G_1$ is a distance between the ends 3a, 3a of the current transformers 3, 3 and the ends 4a, 4a of the earthed tank 4.

Hereupon, the length $L_0$ is the same as and the distances $G_1$ and $G_2$ are substantially equal to between the gas insulation switchgear in accordance with the present invention and the gas insulation switchgear. Therefore, when the distance $G_1$ is equal to the distance $G_2$, the length $L_5$ of the earthed tank 40 in the gas insulation switchgear in accordance with the present invention is shorter the length of two times of $L_1$ than that $L_3$ of the earthed tank 4 in the related art. This is:

$$L_3 = L_0 + 2G_1, \tag{5}$$
$$L_5 = L_0 + 2G_2 - 2L_1, \tag{6}$$
$$G_1 = G_2, \text{ and therefore} \tag{7}$$
$$L_5 - L_3 = 2L_1. \tag{8}$$

As mentioned above, the total length of the gas insulation switchgear in accordance with the present invention is shorten the corresponding total length of the related art, and thereby the space necessary for installation of the gas insulation switchgear becomes smaller.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A gas insulation switchgear, comprising:
    a first earthed tank containing a circuit breaker therein;
    a pair of second earthed tanks, each respectively containing a disconnector therein;
    an expansion joint interconnecting said first earthed tank and each of said pair of second earthed tanks;
    said first earthed tank, said second earthed tanks and said expansion joints together defining a continuous gas-tight space containing an insulation gas;
    a pair of conductors respectively penetrating through said pair of expansion joints and interconnecting said circuit breaker and said disconnectors; and
    a pair of current transformers provided in respective hollow inside spaces of said expansion joints and having holes formed therein in a manner such that said respective pair of conductors pass through said holes formed in said current transformers.

2. A gas insulation switchgear in accordance with claim 1, wherein
    a pair of shield members respectively having a tube shaped part which is respectively disposed between said current transformers and said conductors in said hollow inside spaces.

* * * * *